US010459085B1

(12) United States Patent
Bell et al.

(10) Patent No.: US 10,459,085 B1
(45) Date of Patent: Oct. 29, 2019

(54) SYSTEM AND METHOD FOR VALIDATING GPS ALTITUDE FOR LOW VISIBILITY APPROACHES

(71) Applicant: Rockwell Collins, Inc., Cedar Rapids, IA (US)

(72) Inventors: Douglas A. Bell, Marion, IA (US); James H. Doty, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 532 days.

(21) Appl. No.: 15/344,077

(22) Filed: Nov. 4, 2016

(51) Int. Cl.
  *G01S 19/20* (2010.01)
  *G01S 19/40* (2010.01)
  *G01S 19/53* (2010.01)

(52) U.S. Cl.
  CPC .............. *G01S 19/20* (2013.01); *G01S 19/40* (2013.01); *G01S 19/53* (2013.01)

(58) Field of Classification Search
  CPC ........... G01S 19/20; G01S 19/53; G01S 19/40
  USPC ..................................... 342/357.23
  See application file for complete search history.

(56) References Cited

U.S. PATENT DOCUMENTS

| 5,906,655 | A | * | 5/1999 | Fan | ........... | G01C 21/165 |
| | | | | | | 342/457 |
| 6,167,347 | A | * | 12/2000 | Lin | ........... | G01C 21/165 |
| | | | | | | 342/357.29 |
| 7,962,253 | B1 | | 6/2011 | Owen et al. | | |
| 8,234,068 | B1 | * | 7/2012 | Young | ........... | G01C 21/00 |
| | | | | | | 244/175 |
| 8,321,074 | B1 | | 11/2012 | Bell et al. | | |
| 8,410,975 | B1 | | 4/2013 | Bell et al. | | |
| 8,659,471 | B1 | | 2/2014 | McCusker | | |
| 8,890,746 | B2 | * | 11/2014 | Alizadeh-Shabdiz | ........... | |
| | | | | | | G01S 19/48 |
| | | | | | | 342/357.23 |
| 9,222,799 | B1 | * | 12/2015 | Bell | ........... | G01C 23/00 |
| 9,395,446 | B2 | * | 7/2016 | Rollet | ........... | G01S 19/15 |

(Continued)

OTHER PUBLICATIONS

Federal Aviation Administration, U.S. Department of Transportation, Criteria for Approval of Category I and Category II Weather Minima for Approach, Advisory Circular, AC 120-29A, Aug. 12, 2002, 273 pages.

(Continued)

*Primary Examiner* — Frank J McGue
(74) *Attorney, Agent, or Firm* — Suiter Swantz pc llo (57) ABSTRACT

A system and related method for validating satellite-based navigation data determines an estimated altitude or position solution based on GPS altitude or position data adjusted with inertial altitude or position data integrated with barometric altitude data corrected for air temperature and latitude. The system may include a vertical monitor for validating the GPS altitude data by comparing the weighted, limited, and integrated estimated altitude solution to the GPS altitude data. The integrated altitude solution may compensate for vertical speed offset. The system may provide secondary altitude monitoring by comparing radar altimeter data to local object data to verify obstacle clearance height. The system may include a lateral monitor for validating GPS lateral position data based on weighting and limiting of altitude sources controlled by a height above threshold estimate from the vertical monitor. Validity information may be presented to the pilot or autopilot.

20 Claims, 8 Drawing Sheets

(56) References Cited

U.S. PATENT DOCUMENTS 10,001,376 B1 * 6/2018 Tiana .................... G01C 21/005
2009/0189787 A1 * 7/2009 Khatwa .................... G01C 5/06
340/970

OTHER PUBLICATIONS

NovaLynx Corporation, Fortin Type Mercurial Barometer Instruction Manual, Models 230-7410, 230-7411, 230-7415, 230-7420, 230-7421, © 1988-2006 NovaLynx Corporation, 17 pages.

* cited by examiner

226 — Receiving, via a presentation system, the validity advisory data from the at least one processor 228 — Presenting the validity information represented by the validity advisory data via the presentation system

SYSTEM AND METHOD FOR VALIDATING GPS ALTITUDE FOR LOW VISIBILITY APPROACHES

BACKGROUND

Required Navigation Performance (RNP) standards outline the navigation performance accuracy necessary for aircraft operations within a defined airspace. Examples of RNP standards appear in Advisory Circular AC 120-29A, "Criteria for Approval of Category I and Category II Weather Minima for Approach", published by the Federal Aviation Administration (FAA). An RNP level or type (RNP X), a value in nautical miles (NM) from the intended horizontal position of an aircraft within which the aircraft should be during at least 95 percent of its total flying time, may include performance and functional requirements. A given RNP level may provide for a total system error (TSE) allowable in lateral and longitudinal dimensions within a particular airspace. The TSE may account for path definition errors (PDE), navigation system errors (NSE), and flight technical errors (FTE). The RNP type may specify navigation requirements for the airspace or for a navigation system providing a specified level of accuracy defined by a lateral area of confined airspace within which the RNP-certified aircraft operates. For example, an RNP 0.3 level requires a normal navigational accuracy of 0.3 NM at least 95 percent of the total flight time. Similarly, an RNP 0.1 level requires a normal navigational accuracy of 0.1 NM at least 95 percent of the total flight time. Accordingly, the lower the RNP level, the greater the accuracy of the navigation system.

With the availability of satellite-based navigation systems (e.g., GPS, GLONASS), next-generation airspace systems may rely heavily on GPS-based navigation to which stringent NSE standards may be applied. An instrument approach procedure (IAP) specifying an RNP level of RNP 0.3 (or lower than the standard minima at airports not equipped with Instrument Landing Systems (ILS)) may require a method to detect GPS position errors more rapidly the 6.2 second time-to-alert standard that currently exists. A similar requirement may be made for manufacturers and/or end-users wishing to take advantage of minimum performance standards for enhanced vision systems (EVS), synthetic vision systems (SVS), combined vision systems (e.g., EVS/SVS) or enhanced flight vision systems.

One way to achieve greater navigational accuracy is to reduce the TSE. Because the TSE may comprise PDE, NSE, and FTE, a reduction of any individual component (e.g., the NSE) could reduce the TSE, producing in turn a greater level of navigational accuracy. A reduction of NSE may be achieved by monitoring and/or augmenting navigation data provided by one or more navigation systems, the systems based on independent sources of navigation data. Such independent sources could be used to validate the navigation system data by confirming that satellite-based navigation data falls within narrower desired tolerances commensurate with a lower NSE. Moreover, the confirmation of valid navigation data may permit the reduction of decision altitude (DA) or decision height (DH) of an IAP performed during an approach-for-landing flight segment, where the said IAP may be a Localizer Performance with Vertical Guidance (LPV) or any IAP with vertical guidance requiring higher data integrity.

SUMMARY

Broadly speaking, embodiments of the inventive concepts disclosed herein are directed to systems and methods for validating satellite-based navigation data by monitoring altitude information for use onboard an aircraft during an approach-for-landing phase of flight. With the embodiments disclosed herein, data from SBAS-aided satellite navigation system and corrected altitude data from one or more inertial systems may be employed to monitor the satellite navigation system altitude solution for short-term and long-term faults (or for position biases under a GPS alert limit but larger than an alert limit required for the specific flight phase) and alert the pilot and/or autopilot. In addition, data from the vertical monitoring of the satellite navigation system may be employed to monitor the satellite navigation system lateral position solution for short-term and long-term faults, and alert the pilot and/or autopilot accordingly.

In one aspect, embodiments of the inventive concepts disclosed herein are directed to a system for reducing decision altitude (DA; e.g., during low-visibility approaches) by validating satellite-based navigation data. The system may include an externally sourced navigation system for generating navigation data based on navigational satellites or other sources external to the aircraft. The system may include processors for determining an estimated altitude solution by adjusting the satellite-based navigation data with inertial navigation data received from an internally sourced inertial reference system (IRS) integrated with barometric altitude data received from an Air Data System (ADS) and corrected for air temperature and latitude. The processors may determine the validity of the satellite-based navigation data by comparison with the estimated altitude solution, and generate advisory data for display based on the validity of the satellite-based navigation data.

In a further aspect, embodiments of the inventive concepts disclosed herein are directed to a system for reducing DA by validating satellite-based navigation data. The system may include an externally sourced satellite-based navigation system for generating satellite-based navigation data based on navigational satellites or other sources external to the aircraft. The system may include processors for determining estimated altitude solution by adjusting the satellite-based navigation data with inertial navigation data received from an internally sourced inertial reference system (IRS) integrated with barometric altitude data received from an Air Data System (ADS) and corrected for air temperature and latitude. The processors may determine the validity of the satellite-based navigation data by comparison with the estimated altitude solution, and generate advisory data for display based on the validity of the satellite-based navigation data. The system may estimate the aircraft's current height above threshold (HaTH) based on the integrated inertial navigation data and the runway threshold height of the current approach target. The system may estimate lateral position by adjusting the satellite-based navigation data with inertial navigation data integrated with barometric altitude data corrected according to the HaTH estimate. The system may further determine the validity of the satellite-based navigation data with respect to the lateral position of the aircraft by comparison with the integrated inertial navigation data, and generate advisory data for display based on the validity of the satellite-based navigation data.

In a still further aspect, embodiments of the inventive concepts disclosed herein are directed to a method for reducing DA by validating satellite-based navigation data. The method may include receiving satellite-based navigation data from an externally sourced navigation system. The method may include determining an alternative set of navigation data by adjusting the satellite-based navigation data with inertial navigation data received from an internally sourced IRS, the inertial data integrated with barometric altitude data received from an ADS and corrected for air temperature and latitude. The method may include monitoring obstacle clearance surface (OCS) height by receiving vertical distance data received from a radar altimeter system and terrain elevation data from an object database. The method may include determining the further validity of the satellite-based altitude data by comparing the satellite-based altitude solution to OCS failsafe height. The method may include generating advisory data for display based on the determined validity of the satellite-based navigation data.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and related methods for reducing decision altitude (DA) or decision height (DH) of a Localizer Performance with Vertical Guidance (LPV) or similar Instrument Approach Procedure (IAP) during an approach for landing. The Sensor Fused Approach Monitoring System (SFAMS) may reduce the standard deviation of the altitude solution to 4 feet or less by correcting for vertical and lateral velocity offset. Correcting barometric altitude for latitude may reduce standard deviation and/or offsets (and consequently the time-to-alert) associated with receiving barometric altitude data from a target airport. Additional monitoring may be achieved by comparing radar altimeter output to terrain data as a secondary altitude monitor, or by estimating aircraft height above threshold (HaTH) and feeding the HaTH estimate to a lateral position monitor.

Figure 1:
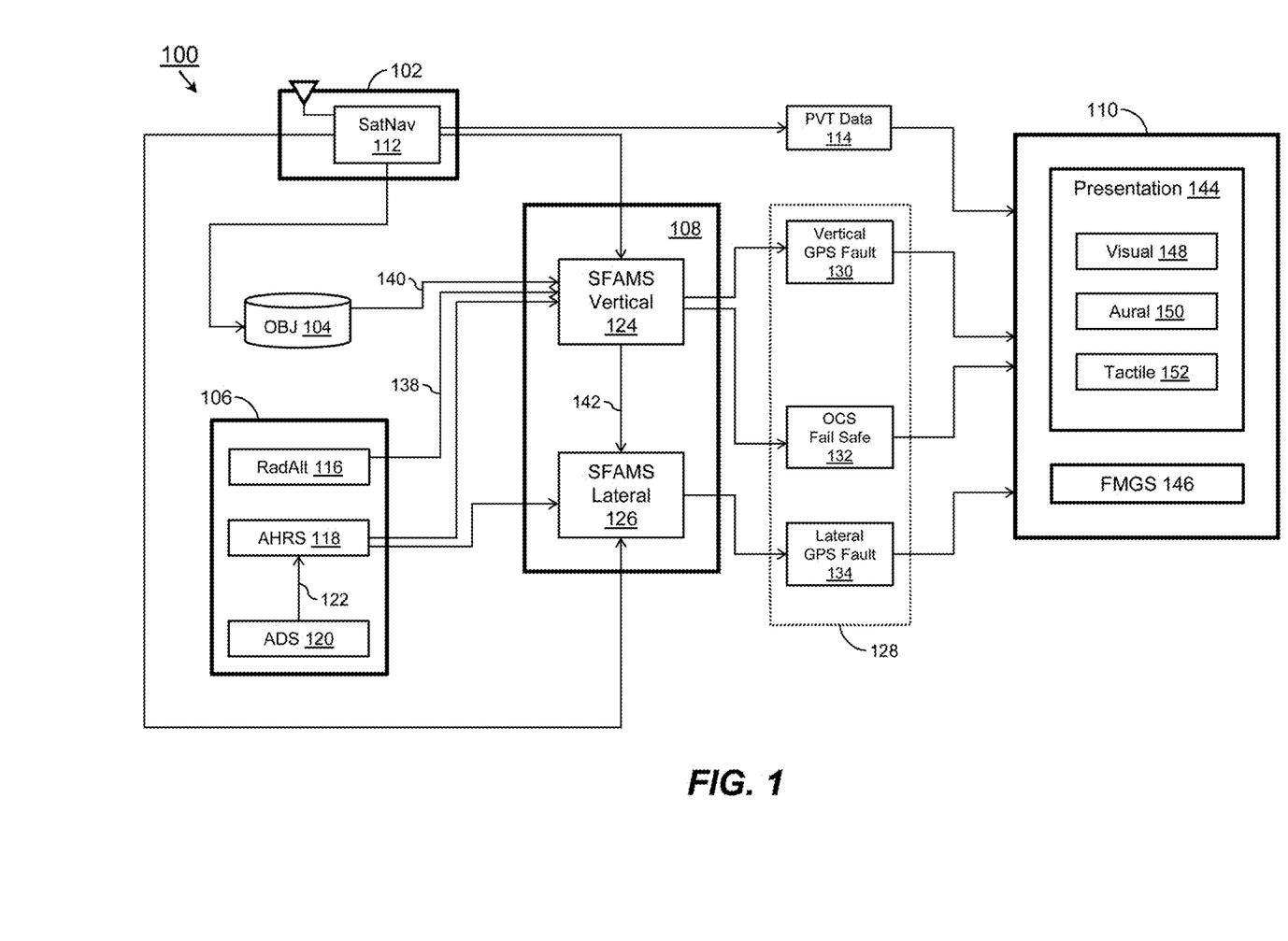
FIG. 1 is a diagrammatic illustration of an exemplary embodiment of a system for reducing DA (e.g., during low-visibility LPV approaches) by validating satellite-based navigation data according to the inventive concepts disclosed herein.

Referring to FIG. 1, an exemplary embodiment of a system 100 for reducing DA by validating satellite-based navigation data according to the inventive concepts disclosed herein may include an externally sourced navigation system 102, an object data source 104, an internally sourced navigation system 106, a processor 108, and a user system 110.

The externally sourced navigation system 102 may include, but is not limited to, a GPS receiver or other similar satellite-based navigation (SatNav) system 112. The SatNav system 112 may determine position/velocity/time (PVT) data 114 based on signals received from navigational satellites or other external data sources. The PVT data 114 output by the SatNav system 112 may comprise geographic coordinates (e.g., latitude/longitude) and altitude data of the aircraft at a particular time. The PVT data 114, as well as other navigation data generated or determined by the externally sourced navigation system 102 and the internally sourced navigation system 106, may include parameters associated with, but not limited to, the accuracy, resolution, integrity, uncertainty, and/or validity of data sets or data elements. For example, the quality of navigation data provided by the externally sourced navigation system 102 may depend on other considerations, e.g., whether an augmentation system is employed to augment satellite signals. A satellite-based augmentation system (SBAS) such as the Wide Area Augmentation System (WAAS) employed by the FAA may increase the accuracy, availability, or integrity of received satellite-based signals. A WAAS broadcast message may improve signal accuracy from 100 meters to approximately 7 meters. A ground-based augmentation system (GBAS) such as the Local Area Augmentation System (LAAS) employed by the FAA may deliver better quality of data than a WAAS by providing extremely high parameters of accuracy, availability, and integrity. For example, a LAAS may demonstrate an accuracy of less than 1 meter with respect to horizontal and vertical axes.

The internally sourced navigation system 106 may include, but is not limited to, a radar altimeter 116 (also known in the art as a "radio altimeter" or "RadAlt"), an attitude heading reference system (AHRS) 118, and an Air Data System (ADS) 120. The radar altimeter 116 may be representative of a system deriving navigation data by sensing the height of an aircraft above the terrain or surface features directly underneath. The radar altimeter 116 may provide output data representative of an aircraft radar altitude, e.g., a height above terrain. The AHRS 118 may be representative of any Inertial Reference System (IRS) in which navigation data is derived from inertial sensors, e.g., accelerometers, gyroscopes, and/or magnetometers. The AHRS 118 may provide output data representative of the aircraft heading, rotational orientation (e.g., pitch/roll/yaw), or accelerations, from which vertical velocity data may be derived from vertical movement over time. The ADS 120 may be representative of any system in which navigation data is derived from an aircraft's pitot-static system and individual sensors thereof. The ADS 120 may provide output data representative of barometric altitude (BaroAlt), altitude trend, computed airspeed, true airspeed, Mach number, static air temperature, and/or total air temperature.

The quality of navigation data may differ among different navigation data sources. For example, barometric altitude information 122 provided by the ADS 120 may not agree with altitude information (PVT data 114) provided by the SatNav system 112. Moreover, neither of these sources may agree precisely with the actual altitude of the aircraft. In order to validate altitude information (PVT data 114) provided by the externally-sourced navigation data source 102, the internally-sourced navigation data sources 106 may be integrated with each other and with the externally-sourced navigation data source 102 to validate navigation data as discussed in detail below.

The processor 108 may include, but is not limited to, a Sensor Fused Approach Monitoring System (SFAMS) vertical monitor 124 (e.g., altitude monitor, vertical distance monitor) and a SFAMS lateral monitor 126. The processor 108 may comprise one or more of any electronic data processing unit which executes software or computer instruction code that could be stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The processor 108 may be driven by the execution of software or computer instruction code containing algorithms developed for the specific functions embodied herein. The processor 108 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the processor 108 could also consist of more than one electronic data processing unit or a multi-core avionics processor comprising two or more processing cores, which cores may be further partitionable into virtual machines. As embodied herein, the processor 108 could be a processor(s) used by or in conjunction with any other system of the aircraft including, but not limited to, the externally sourced navigation system 102, the internally sourced navigation system 106, the object data source 104, the user system 110, a flight management system (FMS), or any combination thereof. For example, the processor may include one or more processors (or processing cores) whereby both, or all, processors receive the PVT data 114 from the externally sourced navigation system 102. A first processor may determine an estimated altitude solution, while a second processor determines the validity of the PVT data 114 based on the estimated altitude solution and generates validity advisory data based on the determination.

The processor 108 may be programmed or configured to receive as input data representative of information obtained from various systems and/or sources including, but not limited to, the externally sourced navigation system 102, the internally sourced navigation system 106, and the object data source 104. As embodied herein, the terms "programmed" and "configured" are synonymous. The processor 108 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a data bus or through a wireless network. The processor 108 may be programmed or configured to execute any methods according to the inventive concepts disclosed herein and discussed in detail below. The processor 108 may be programmed or configured to provide output data to various systems and/or units including, but not limited to, the user system 110.

The SFAMS may provide critical monitoring of GPS altitude (PVT data 114) at an accuracy level beyond that achievable by the integrity monitoring of the SatNav system 112 itself, in order to reduce the DA for low visibility LPV approach procedures below the current limit of 200 feet above ground level (AGL). The SFAMS may reduce the time-to-alert for GPS errors or faults detected in the PVT data 114. For example, SFAMS data validation (128) may include one or more of detecting a vertical GPS fault 130, monitoring the obstacle clearance surface (OCS) failsafe height 132, and detecting a lateral GPS fault 134. The vertical GPS fault 130 may be detected by the SFAMS vertical monitor 124 via comparison of GPS altitude data (based on PVT data 114 determined by the SatNav system 112) to an estimated altitude solution based on integrated inertial altitude data determined by the internally sourced navigation system 106. The OCS failsafe height 132 may be detected by the SFAMS vertical monitor 124 via comparison of vertical distance data 138 (determined by the radar altimeter 116) with object data 140 from object data sources 104. The OCS failsafe monitor 132 may thereby serve as a secondary altitude monitor. Lateral GPS faults 134 may be similarly detected by the SFAMS lateral monitor 126 based on a height above threshold (HaTH) estimate 142 generated by the SFAMS vertical monitor 124.

Object data 140 retrieved from the object data source 104 may include one of more sources of terrain data and/or surface feature data. The object data source 104 may include a terrain database configured to store terrain data contained in digital elevation models (DEM), e.g., as representative grids or terrain cells. The object data source 104 may include one or more surface feature databases configured to store object data 140 representative of, e.g., natural obstacles, manmade structures, bodies of water, and paved or unpaved surfaces.

It should be noted that data contained in any database discussed herein may be stored in a digital memory storage device or computer-readable media including, but not limited to, RAM, ROM, CD, DVD, hard disk drive, diskette, solid-state memory, PCMCIA or PC Card, secure digital cards, and compact flash cards. Any data contained in such databases could be loaded while an aircraft is on the ground or in flight. Any data contained in such databases could be provided manually or automatically through an aircraft system capable of receiving and/or providing such manual or automated data. Any database used according to the inventive concepts disclosed herein may be a stand-alone database or a combination of databases.

The user system 110 may comprise any system or subsystem that may use or receive navigation data (e.g., PVT data 114) or validation data (validity advisory data) representative of the validity information of navigation data, where such navigation data could be representative of measurement(s) of a geographic position or altitude of the aircraft. For example, the user system 110 may include, but is not limited to, one or more presentation systems 144 and a flight management and guidance system (FMGS) 146. In some embodiments, the user system 110 may include one or more of the externally sourced navigation system 102, the internally sourced navigation system 106, and the object data source 104.

The presentation system 144 may comprise a visual display unit 148, an aural advisory unit 150, and/or a tactile advisory unit 152 for presenting the pilot with navigation data validity information. For example, the visual display unit 148 may include a vision system (not shown) which generates an image data set which represents the image displayed on a display unit. Vision systems may include, but are not limited to, a synthetic vision system (SVS), an enhanced vision system (EVS), and/or a combined SVS/EVS. The visual display unit 148 may comprise any unit configured to present the pilot with visual information or indications regarding the validity of navigation data (e.g., PVT data 114). The visual display unit 148 may comprise, for example, a Primary Flight Director (PFD), navigation display, head-down display (HDD), head-up display (HUD), head-worn display (HWD), Multipurpose Control Display Unit, Engine Indicating and Crew Alerting System, Electronic Centralized Aircraft Monitor, multi-function display (MFD), side displays, and Data Link Control Display Unit. The inventive concepts disclosed herein may apply to a portable device, e.g., a tablet employing a visual display unit 148 and/or an aural advisory unit 150.

The presentation system 144 may present or display SFAMS validity information regarding PVT data 114 or other navigation data by displaying or projecting the validity information on a screen or surface of the visual display unit 148. For example, validity information may include advisories, alerts, and non-alerts and be based on a threat level or condition requiring immediate crew awareness. A caution alert may require subsequent crew response in addition to immediate crew awareness, while a warning alert may require immediate crew action. Caution alerts, warning alerts, and other alerts and advisories based on validity information may be presented in combination with, or simultaneous to, aural alerts and/or tactile alerts. For example, an advisory or alert may be presented visually by depicting one or more colors corresponding to a predetermined threat level: red may indicate a warning alert, amber or yellow may indicate a caution alert, and green, white, or cyan may indicate a non-alert advisory. Visual advisories or alerts presented by the visual display system 148 may include textual advisories corresponding to particular on-ground and in-flight conditions, e.g., a favorable validity determination, an unfavorable validity determination, an indication that a validity determination is incomplete or in process, and whether a particular validity determination conforms to some RNP levels but not to other, more restrictive, RNP levels.

The aural advisory unit 150 may comprise any unit capable of producing aural alerts or advisories based on received validity information, e.g., sounds, tones, or verbal annunciations of a condition or event. For example, the aural advisory unit 150 may indicate a favorable, unfavorable, or incomplete validity determination as well as caution alerts, warning alerts, or other non-alert advisories. Aural advisories may be presented in combination with, or simultaneous to, visual advisories and/or tactile advisories.

The tactile advisory unit 152 may comprise any unit capable of producing tactile alerts based on validity information, e.g., any tactile stimulus indicative of a condition or event. Aural advisories may be presented in combination with, or simultaneous to, visual advisories and/or aural advisories.

The FMGS 146 may comprise any system configured to provide autopilot, flight direction, autothrottle, and/or other flight management functions. For example, the FMGS 146 may control automated operation of an aircraft during an IAP to an intended runway. An unfavorable validity determination with respect to PVT data 114 may, for example, result in disengaging the FMGS 146 during the IAP, switching (either automatically or manually) to an alternative navigation source that meets validity requirements, or increase the DA at which the pilot must decide whether to continue the IAP or execute a missed approach.

Figure 2A:
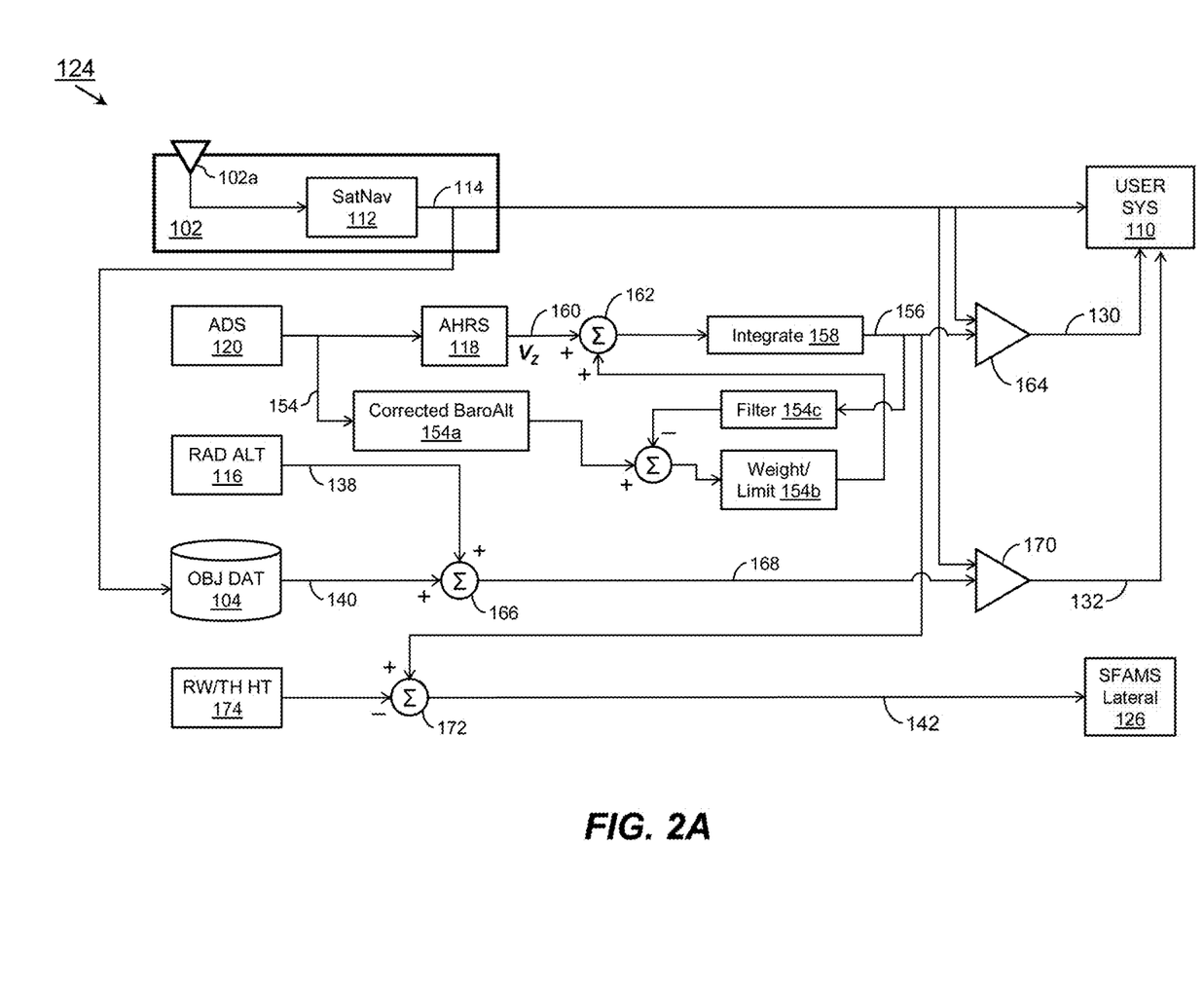
FIG. 2A is a diagrammatic illustration of the vertical monitor of FIG. 1.

Referring to FIG. 2A, the SFAMS vertical monitor 124 of FIG. 1 may validate PVT data 114 generated by the SatNav system 112 based on signals received from external navigation sources via a receiver 102a of the externally sourced navigation system 102. The SFAMS vertical monitor 124 may receive barometric altitude data (154) from the ADS 120 and enhance the validity monitoring of PVT data 114 by correcting (154a) the barometric altitude data 154 for temperature, latitude, and pressure conditions at an intended airport or proximate station. By reducing latency associated with the barometric altitude data 154, the SFAMS vertical monitor 124 may reduce the time-to-alert associated with detecting offsets in GPS altitude (e.g., vertical GPS fault 130).

For example, barometric altitude data 154 received from the ADS 120 may be corrected for local barometric pressure to enhance accuracy. However, barometric measurements may be subject to atmospheric pressure measured errors due to lag created by the ADS 120 (e.g., by the aircraft pitot-static system). For example, barometric altitude data 154 corresponding to a particular time t may lag several seconds behind PVT data 114 corresponding to the same time t (due, e.g., to the time required for air to escape the pitot-static system (not shown) coupled to the ADS 120). Furthermore, variations in barometric pressure due to the passage of weather fronts, non-standard air temperatures, and other atmospheric conditions occurring between the position of the aircraft and the barometric pressure reference point (e.g., the target airport) may result in offset barometric altitude data. The accuracy of PVT data 114 output by the SatNav system 112 may be enhanced by SBAS augmentation. However, the augmented altitude data may still be subject to error resulting from undetected satellite errors, terrain masking, or signal-in-space faults. In addition, SBAS-augmented fault detection may introduce additional delay associated with the detection of faults via SBAS ground stations, and the relaying of validity information from the ground stations to the aircraft.

The SFAMS vertical monitor 124 may monitor PVT data 114 received from the SatNav system 112 for short-term and long-term vertical GPS faults (130) and advise or alert the pilot or autopilot via the user system 110. For example, the SFAMS vertical monitor 124 may determine an estimated altitude solution 156 by integrating (158) barometric-aided inertial vertical velocity data (160, $V_Z$) from the AHRS 118 and combining the inertial velocity data (162) with an authority-limited and weighted barometric altitude (154*b*) corrected for the current latitude of the aircraft and filtered (154*c*) to correct for time or lag offset between the ADS 120 and the SatNav system 112. For example, because the earth is oblate-spheroidal rather than perfectly spherical, gravitational pull (and thus normalized sea-level pressure) may vary with latitude. The SFAMS vertical monitor 124 may correct barometric altitude data (154*a*) for latitude north or south of the equator. The weighting and authority limit values (154*b*) may be adjusted during the approach procedure as a function of time and/or height above the runway to ensure the accuracy of the estimated altitude solution 156 (as, e.g., the offset between the ADS 120 and the barometric correction reporting point (e.g., a target airport or proximate ground runway) may approach zero as the position of the aircraft approaches that of the intended runway). The SFAMS vertical monitor 124 may correct barometric altitude data (154*a*) to compensate or account for barometric pressure correction errors associated with the current distance of the aircraft from the barometric correction reporting point (e.g., a target airport or proximate ground station).

The SFAMS vertical monitor 124 may compare (164) the estimated altitude solution 156 with PVT data 114 from the SatNav system 112 to determine whether the agreement between the satellite-based PVT data 114 and the inertial-based estimated altitude solution 156 falls within acceptable limits. Predetermined acceptable and alert limits may be adjusted based on a variety of dynamic factors (e.g., time, the height of the aircraft above the runway, the particular type of approach procedure) to ensure that significant or hazardous errors of the SatNav system 112 are detected. For example, if the PVT data 114 and estimated altitude solution 156 do not agree within a predetermined alert limit, an advisory or alert may be presented to the pilot (via the user system 110) or to an automated flight control system (e.g., FMGS 146, FIG. 1) so that an approach procedure may be modified or aborted as necessary to ensure safe flight and landing.

The SFAMS vertical monitor 124 may provide secondary monitoring of the aircraft altitude via vertical distance data 138 received from the radar altimeter 116. For example, vertical distance data 138 may be combined (166) with terrain or surface feature data (object data 140) corresponding to the current position of the aircraft (as determined by the PVT data 114 and retrieved from the object data source 104). The resulting OCS height estimate 168 may be compared (170) to the PVT data 114 to verify that the current altitude of the aircraft is above the minimum OCS height required to clear the highest obstacle in or near the flight path corresponding to the current approach procedure. For example, the minimum OCS height may be a consistent level OCS height associated with a level flight procedure or a dynamically sloping OCS height configured for approach and descent procedures. If the margin between the OCS height estimate 168 and PVT data 114 is not within acceptable limits, an advisory or alert may be presented to the pilot (via the user system 110) or autopilot (e.g., FMGS 146) so that an approach procedure may be modified or aborted as necessary to ensure obstacle clearance at all times.

Further, the estimated altitude solution 156 determined by the SFAMS vertical monitor 124 may be combined (172) with a runway threshold height 174 to generate a height above threshold (HaTH) estimate 142. The runway threshold height 174 may be a screen height or threshold crossing height particular to the intended runway associated with a current approach procedure, and may be retrievable from a memory (not shown) coupled to the processor 108 or from the target airport. The HaTH estimate 142 may be passed to the SFAMS lateral monitor 126 to control the weighting and limiting of positioning sources by the lateral monitor, as described in further detail below.

Figure 2B:
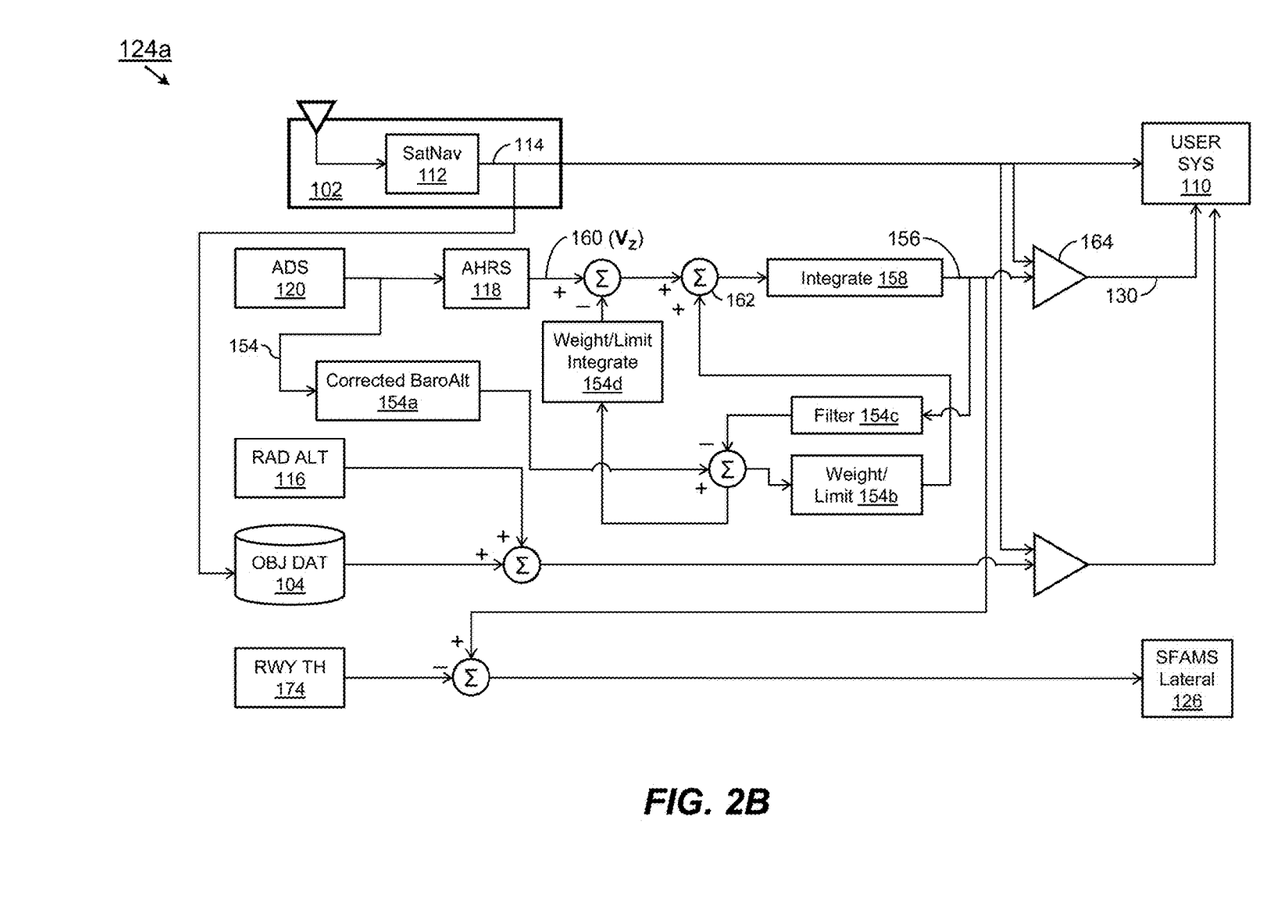
FIG. 2B is a diagrammatic illustration of an alternative embodiment of the vertical monitor of FIG. 1.

Referring to FIG. 2B, a SFAMS vertical monitor 124*a* may be implemented and may function similarly to the SFAMS vertical monitor 124 of FIG. 2A, except that the SFAMS vertical monitor 124*a* may correct for offsets in the vertical velocity data $V_Z$ (160) determined by the AHRS 118 via compensation filtering, thereby reducing further the standard deviation of errors between the PVT data 114 and the estimated altitude solution 156. The vertical speed (VS) compensation filter may provide for an additional level of integration (154*d*) of the corrected, authority-limited, filtered, and weighted barometric altitude data (154*a-c*) in the determination of the estimated altitude solution 156.

Figure 3:
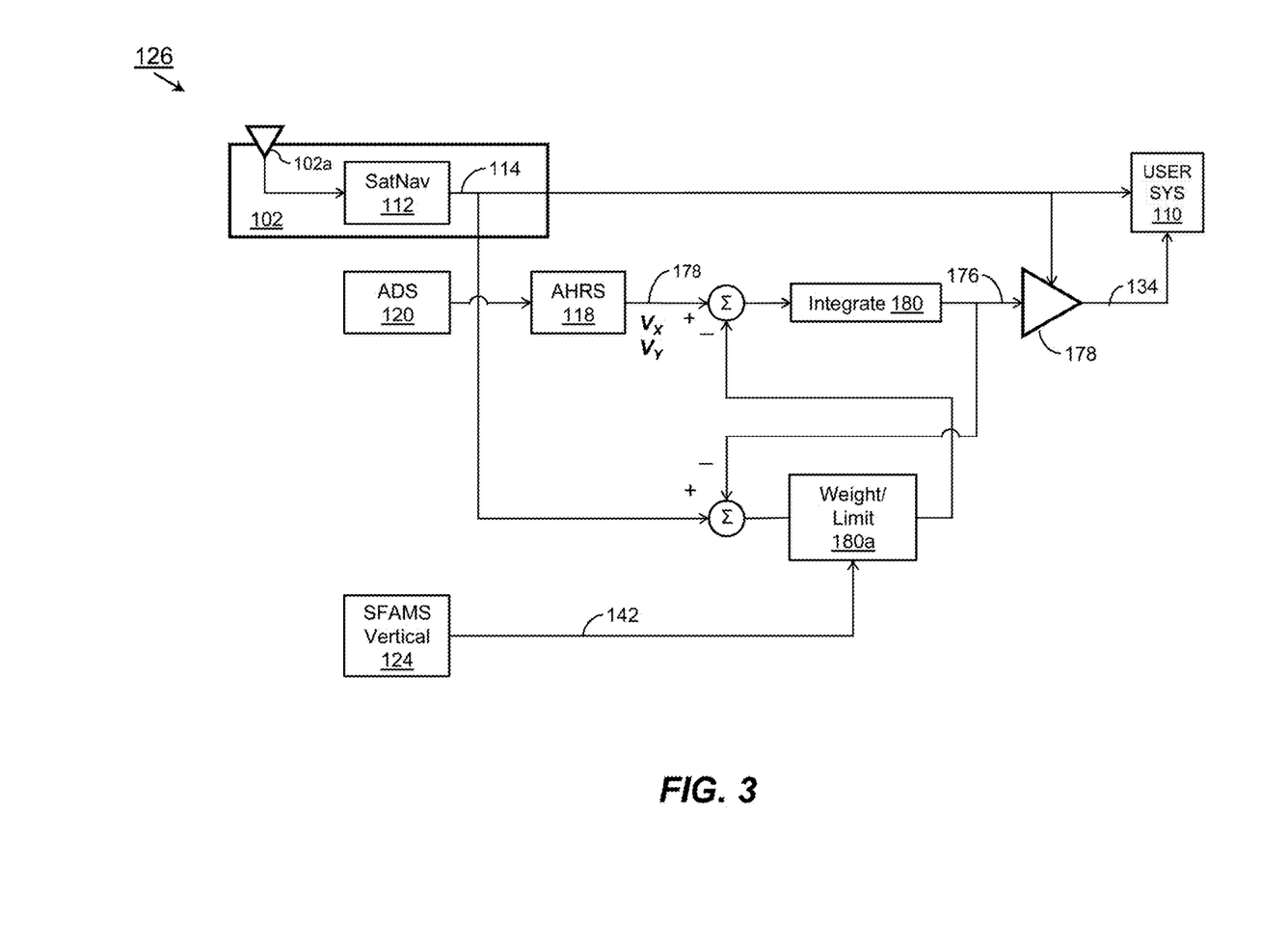
FIG. 3 is a diagrammatic illustration of the lateral monitor of FIG. 1.

Referring to FIG. 3, the SFAMS lateral monitor 126 of FIG. 1 may receive the HaTH estimate 142 generated by the SFAMS vertical monitor 124 of FIG. 1 (described in detail by FIGS. 2A-B). The SFAMS lateral monitor 126 may monitor GPS errors or faults in lateral position (134) to ensure that any errors do not exacerbate GPS vertical faults (130, FIG. 1) or adversely affect the accuracy of the SFAMS vertical monitor 124. For example, the SFAMS lateral monitor 126 may generate an estimated lateral position solution 176 of the aircraft based on barometric-assisted (via the ADS 120) inertial position data 178 received from the AHRS 118 and integrated (180) with a combination of PVT data 114 and the estimated lateral position solution 176, the weighting and authority-limiting (180*a*) of navigation data sources (external/internal, satellite-based/inertial) controlled by the HaTH estimate 142 received from the SFAMS vertical monitor 124. The weighting and authority limiting (180*a*) of navigation data sources by the SFAMS lateral monitor 126 may correct for offsets in lateral speed (Vx, Vy) determined by the AHRS 118.

Referring now to FIGS. 4A-D, an exemplary embodiment of a method 200 for reducing minimum decision altitude (DA) by validating satellite-based navigation data according to the inventive concepts disclosed herein may be implemented by the system 100 in some embodiments, and may include one or more of the following steps.

Figure 4A:
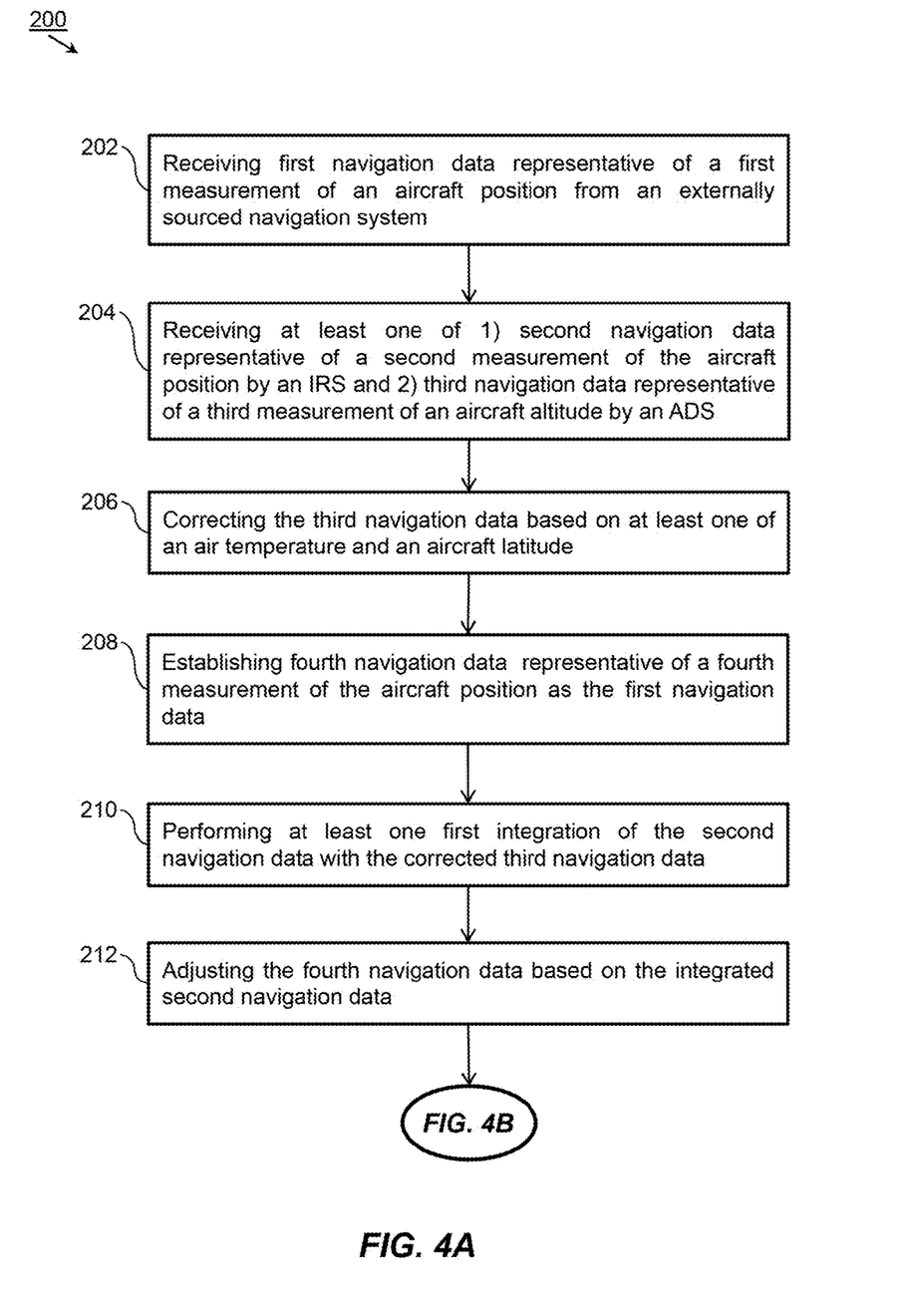
FIGS. 4A-4D illustrate an exemplary embodiment of a method for reducing DA (e.g., during low-visibility LPV approaches) by validating satellite-based navigation data according to the inventive concepts disclosed herein.

Referring in particular to FIG. 4A, at a step 202, the SFAMS vertical monitor receives first navigation data (e.g., satellite-based PVT data) representative of a first measurement of an aircraft altitude from an externally sourced navigation system (e.g., the SatNav system).

At a step 204, the SFAMS vertical monitor receives internally sourced navigation data from an internally sourced navigation system. For example, the SFAMS vertical monitor may receive second navigation data (e.g., inertial altitude data) representative of a second measurement of the aircraft position by inertial sensors of an aircraft inertial reference system (IRS) and third navigation data (e.g., barometric altitude data) representative of a third measurement of the aircraft position by an air data system (ADS).

At a step 206, the SFAMS vertical monitor corrects the barometric altitude data according to air temperature and aircraft latitude.

At a step 208, the SFAMS vertical monitor determines fourth navigation data representative of a fourth measurement of the aircraft altitude (e.g., an inertial-based estimated altitude solution) by first establishing the estimated altitude solution based solely on the satellite-based PVT data.

At a step 210, the SFAMS vertical monitor performs at least one first integration of the IRS-based inertial altitude data with the corrected barometric altitude data. The SFAMS vertical monitor may perform at least one third (e.g., additional, second-order) integration, via a vertical speed compensation filter, of the inertial altitude data with vertical velocity information received from the IRS.

At a step 212, the SFAMS vertical monitor periodically adjusts the estimated altitude solution with the corrected barometric altitude data.

Figure 4B:
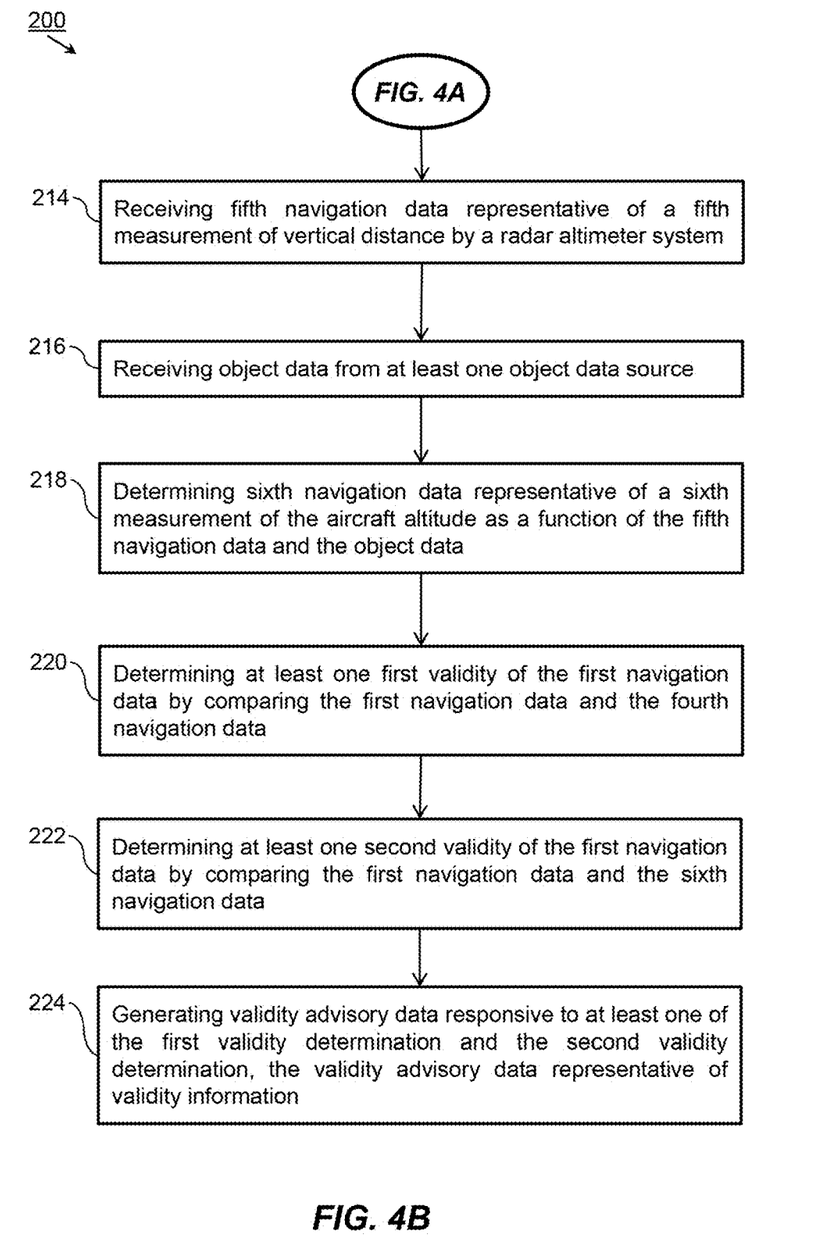

Referring now to FIG. 4B, at a step 214, the SFAMS vertical monitor receives fifth navigation data (e.g., a vertical distance estimate) representative of a fifth measurement of vertical distance by an aircraft radar altimeter system.

At a step 216, the SFAMS vertical monitor receives object data representative of terrain elevation or surface feature elevation from an object data source.

At a step 218, the SFAMS vertical monitor determines sixth navigation data representative of a sixth measurement of the aircraft altitude (e.g., an obstacle clearance surface (OCS) height estimate) as a function of the vertical distance estimate and the object data.

At a step 220, the SFAMS vertical monitor determines a first validity (e.g., vertical GPS fault) of the satellite-based PVT data by comparing the PVT data and the estimated altitude solution. For example, the SFAMS vertical monitor may determine whether a delta, or difference, between the altitude solution indicated by the PVT data and the estimated altitude solution falls within an acceptable range, an advisory range, or an alert range.

At a step 222, the SFAMS vertical monitor determines a second validity (e.g., OCS failsafe height) of the satellite-based PVT data by comparing the PVT data and the OCS height estimate. For example, the SFAMS vertical monitor may determine whether a delta, or difference, between the altitude solution indicated by the PVT data and the OCS height estimate falls within an acceptable range, an advisory range, or an alert range.

At a step 224, the SFAMS vertical monitor generates validity advisory data responsive to one or more of the detected vertical GPS faults and the detected OCS failsafe height, the validity advisory data representative of validity information for display by the user system or use by a flight management system (FMS).

Figure 4C:
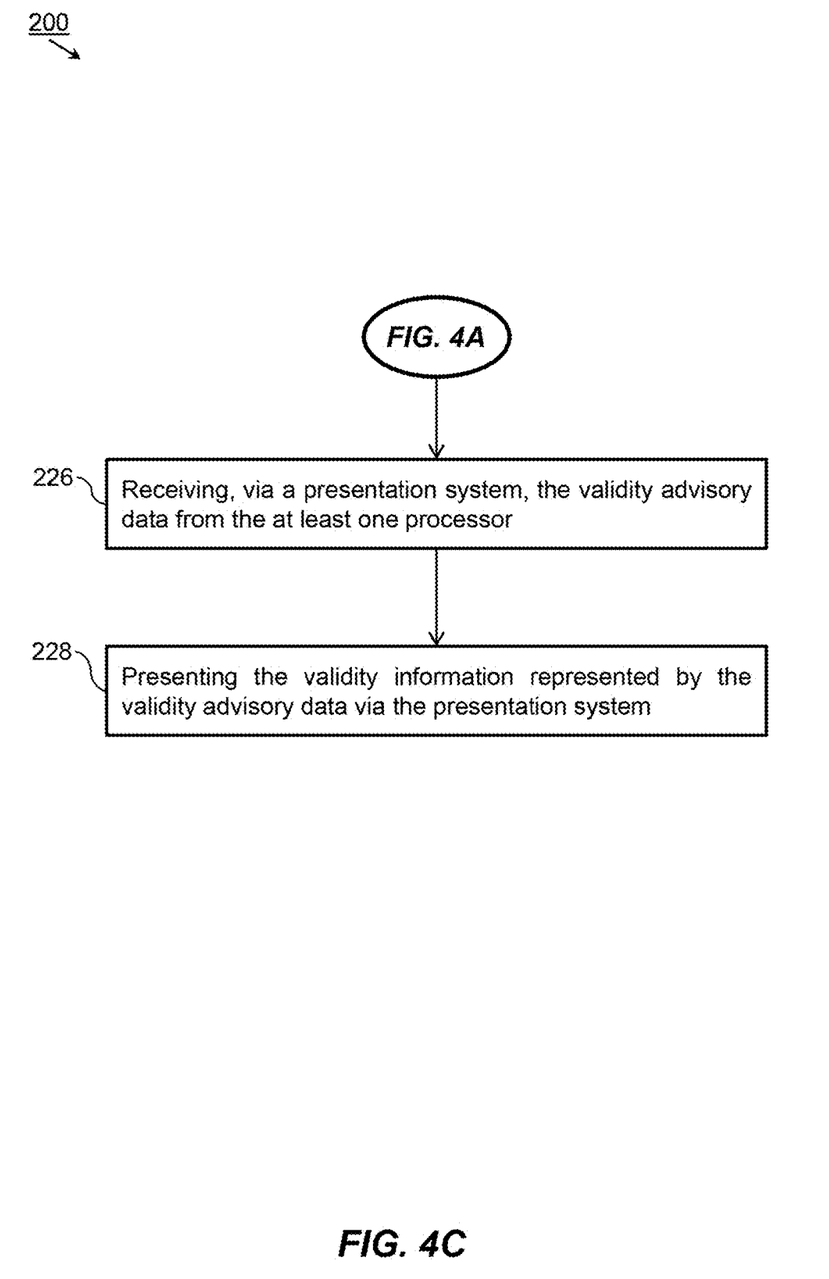

Referring to FIG. 4C, the method 200 may include additional method steps 226 and 228. At the step 226, the presentation system receives the validity advisory data from the SFAMS vertical monitor.

At the step 228, the presentation system presents the validity information represented by the validity information data. For example, the validity information may be presented as visual or textual information via a visual display unit, as an aural advisory or alert generated by an aural alert system, or as a tactile alert generated by a tactile alert system.

Figure 4D:
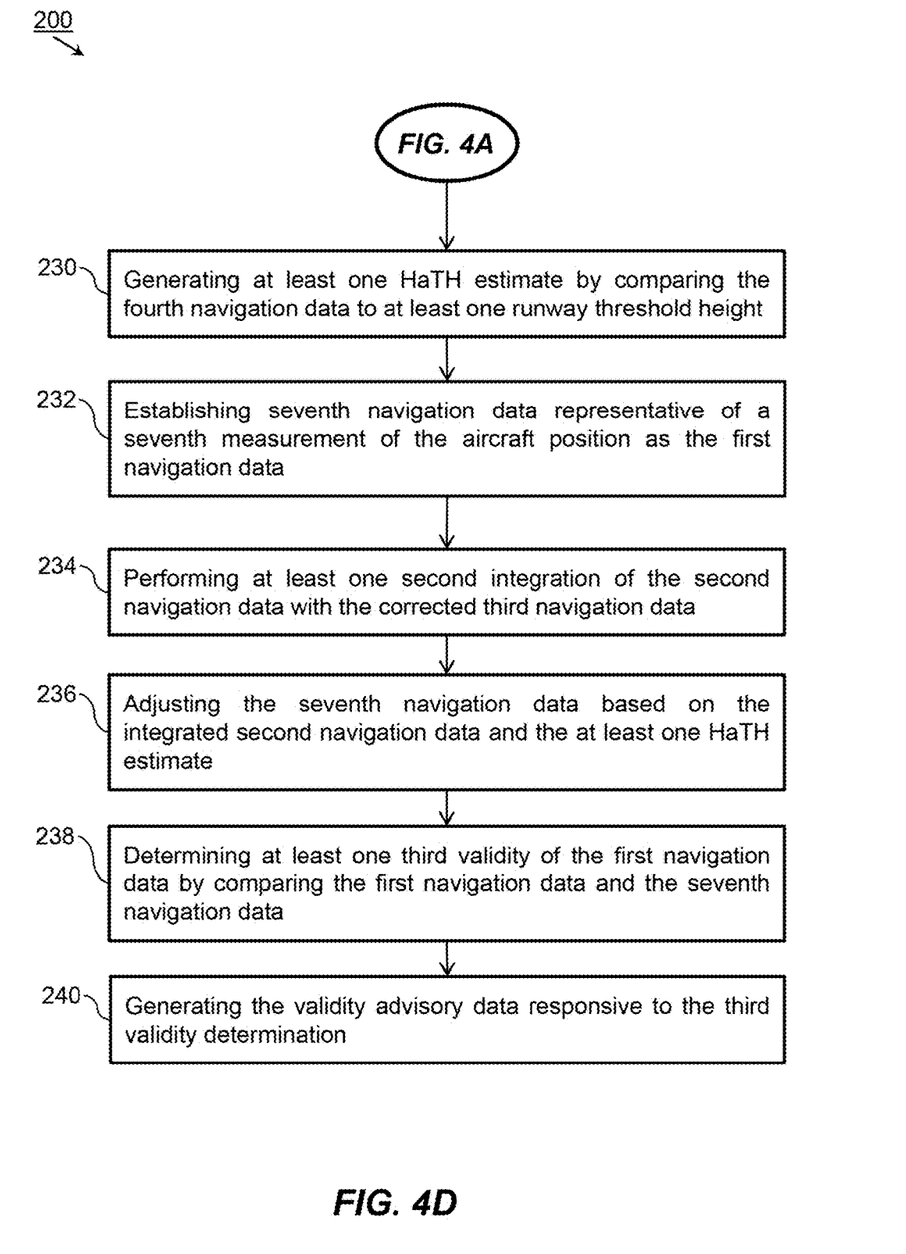

Referring to FIG. 4D, the method 200 may include additional method steps 230 through 240. At the step 230, the SFAMS vertical monitor generates a height above threshold (HaTH) estimate by comparing the estimated altitude solution to a runway threshold height.

At a step 232, the SFAMS lateral monitor determines seventh navigation data representative of a seventh measurement of the aircraft position (e.g., an inertial-based estimated lateral position solution) by first establishing the seventh measurement solely via PVT data.

At a step 234, the SFAMS lateral monitor performs at least one third integration of the IRS-based inertial altitude data with the corrected barometric altitude data.

At a step 236, the SFAMS lateral monitor periodically adjusts the estimated lateral position solution with the integrated IRS-based inertial altitude data, based on the HaTH estimate received from the SFAMS vertical monitor.

At a step 238, the SFAMS lateral monitor determines a third validity (e.g., estimated lateral GPS fault) by comparing the PVT data and the estimated lateral position solution. For example, the SFAMS lateral monitor may determine whether a delta, or difference, between the lateral position solution indicated by the PVT data and the estimated lateral position solution falls within an acceptable range, an advisory range, or an alert range.

At the step 240, the SFAMS lateral monitor generates validity advisory data responsive to the detected lateral GPS fault, the validity advisory data representative of validity information for display by the user system or use by the FMS.

As will be appreciated from the above, systems and methods according to embodiments of the inventive concepts disclosed herein may reduce the decision altitude (DA) during low visibility approaches by validating satellite-based data based on internally sourced navigation data corrected for barometric pressure reporting errors as well as vertical and lateral velocity offsets. Secondary monitoring may be achieved by validating the satellite-based data using radar altimeter system and terrain data and by correcting validation of satellite-based lateral position based on estimated HaTH.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A system for validating navigation data, comprising:
at least one externally sourced navigation system configured to provide first navigation data representative of a first measurement of an aircraft altitude; and
at least one processor configured to:
receive the first navigation data;
receive internally sourced navigation data from at least one internally sourced navigation system, the internally sourced navigation data comprising:
second navigation data representative of a second measurement of the aircraft altitude by at least one inertial reference system (IRS) and
third navigation data representative of a third measurement of the aircraft altitude by at least one air data system (ADS);
correct the third navigation data based on at least one of an air temperature and an aircraft latitude;
determine fourth navigation data representative of a fourth measurement of the aircraft altitude as a function of one or more operations comprising:
a first operation establishing the fourth measurement of the aircraft altitude with the first navigation data; and
a second operation periodically adjusting the fourth measurement of the aircraft altitude with the second navigation data, the second operation including at least one first integration of the second navigation data with the corrected third navigation data;
determine at least one first validity of the first navigation data by comparing the first navigation data and the fourth navigation data; and
generate validity advisory data responsive to the first validity determination and representative of validity information.

2. The system of claim 1, wherein:
the at least one processor is configured to determine the first validity of the first navigation data to be valid when a first delta corresponding to the first navigation data and the fourth navigation data is within a first predetermined threshold.

3. The system of claim 1, wherein:
the internally sourced navigation data includes fifth navigation data representative of a fifth measurement of vertical distance by a radar altimeter system; and
the at least one processor is configured to:
determine sixth navigation data representative of a sixth measurement of the aircraft altitude as a function of the fifth navigation data and object data representative of at least one of a terrain elevation or a surface feature elevation, the object data received from at least one object data source;
determine at least one second validity of the first navigation data by comparing the first navigation data and the sixth navigation data; and
generate the validity advisory data responsive to the second validity determination and representative of the validity information.

4. The system of claim 3, wherein:
the at least one processor is configured to determine the second validity of the first navigation data to be valid when a second delta corresponding to the first navigation data and the sixth navigation data is within a second predetermined threshold.

5. The system of claim 1, further comprising:
at least one presentation system configured to:
receive the validity advisory data from the at least one processor; and
present the validity information represented by the validity advisory data as at least one of:
visual validity information presented by a screen of a display unit;
aural validity information presented by an aural alert unit; and
tactile validity information presented by a tactile alert unit.

6. The system of claim 1, wherein the second operation includes at least one second integration of the second navigation data with seventh navigation data representative of a seventh measurement of inertial velocity received from the at least one internally sourced navigation system.

7. The system of claim 1, wherein:
the at least one processor comprises a first processor and a second processor;
the first navigation data is received by the first processor and the second processor;
the fourth navigation data is determined by the first processor;
the first validity of the first navigation data is determined by the second processor; and
the validity advisory data is generated by the second processor.

8. A system for validating navigation data, the system comprising:
at least one externally sourced navigation system configured to provide first navigation data representative of a first measurement of an aircraft position; and
at least one processor configured to:
receive the first navigation data;
receive internally sourced navigation data from at least one internally sourced navigation system, the internally sourced navigation data comprising:
second navigation data representative of a second measurement of the aircraft position by at least one inertial reference system (IRS) and
third navigation data representative of a third measurement of an aircraft altitude by at least one air data system (ADS);
correct the third navigation data based on at least one of an air temperature and an aircraft latitude;
determine fourth navigation data representative of a fourth measurement of the aircraft altitude as a first function of one or more operations comprising:
a first operation establishing the fourth measurement of the aircraft altitude with the first navigation data; and
a second operation periodically adjusting the fourth measurement of the aircraft altitude with the second navigation data, the second operation including at least one first integration of the second navigation data with the corrected third navigation data;

determine at least one first validity of the first navigation data by comparing the first navigation data and the fourth navigation data;
generate at least one height above threshold (HaTH) estimate by comparing the fourth navigation data and at least one runway threshold height;
determine fifth navigation data representative of a fifth measurement of the aircraft position as a second function of one or more operations comprising:
  a third operation establishing the fifth measurement of the aircraft position with the first navigation data; and
  a fourth operation periodically adjusting the fifth measurement of the aircraft position with the second navigation data based on the at least one HaTH estimate, the fourth operation including at least one second integration of the second navigation data with the corrected third navigation data;
determine at least one second validity of the first navigation data by comparing the first navigation data and the fifth navigation data; and
generate validity advisory data responsive to at least one of the first validity determination and the second validity determination and representative of validity information.

9. The system of claim 8, wherein:
the at least one processor is configured to determine the first validity of the first navigation data to be valid when a first delta corresponding to the first navigation data and the fourth navigation data is within a first predetermined threshold; and
the at least one processor is configured to determine the second validity of the second navigation data to be valid when a second delta corresponding to the first navigation data and the fifth navigation data is within a second predetermined threshold.

10. The system of claim 8, wherein:
the internally sourced navigation data includes sixth navigation data representative of a sixth measurement of vertical distance by at least one radar altimeter system; and
the at least one processor is configured to:
  determine seventh navigation data representative of a seventh measurement of the aircraft altitude as a function of the sixth navigation data and object data representative of at least one of a terrain elevation or a surface feature elevation, the object data received from at least one object data source;
  determine at least one third validity of the first navigation data by comparing the first navigation data and the seventh navigation data; and
generate the validity advisory data responsive to the third validity determination and representative of the validity information.

11. The system of claim 8, further comprising:
at least one presentation system configured to:
  receive the validity advisory data from the at least one processor; and
  present the validity information represented by the validity advisory data as at least one of:
    visual validity information presented by a screen of a display unit;
    aural validity information presented by an aural alert unit; and
    tactile validity information presented by a tactile alert unit.

12. The system of claim 8, wherein the second operation includes at least one third integration of the second navigation data with eighth navigation data representative of an eighth measurement of inertial velocity received from the at least one internally sourced navigation system.

13. The system of claim 8, wherein:
the at least one processor comprises a first processor and at least one second processor;
the first navigation data is received by the first processor and the at least one second processor;
the fourth navigation data and the fifth navigation data are determined by the at least one second processor;
the first validity and the second validity are determined by the at least one second processor; and
the validity advisory data is generated by the at least one second processor.

14. A method for validating navigation data, the method comprising:
receiving, via at least one processor, first navigation data representative of a first measurement of an aircraft position from an externally sourced navigation system;
receiving, via the at least one processor, at least one of 1) second navigation data representative of a second measurement of the aircraft position by an inertial reference system (IRS) and 2) third navigation data representative of a third measurement of an aircraft altitude by an air-data system (ADS);
correcting, via the at least one processor, the third navigation data based on at least one of an air temperature and an aircraft latitude;
establishing, via the at least one processor, fourth navigation data representative of a fourth measurement of the aircraft position as the first navigation data;
performing, via the at least one processor, at least one first integration of the second navigation data with the corrected third navigation data;
adjusting, via the at least one processor, the fourth navigation data based on the integrated second navigation data;
receiving, via the at least one processor, fifth navigation data representative of a fifth measurement of vertical distance by a radar altimeter system;
receiving, via the at least one processor, object data representative of at least one of a terrain elevation or a surface feature elevation from at least one object data source;
determining, via the at least one processor, sixth navigation data representative of a sixth measurement of the aircraft altitude as a function of the fifth navigation data and the object data;
determining, via the at least one processor, at least one first validity of the first navigation data by comparing the first navigation data and the fourth navigation data;
determining, via the at least one processor, at least one second validity of the first navigation data by comparing the first navigation data and the sixth navigation data; and
generating, via the at least one processor, validity advisory data responsive to at least one of the first validity determination and the second validity determination, the validity advisory data representative of validity information.

15. The method of claim 14, wherein:
determining, via the at least one processor, at least one first validity of the first navigation data by comparing the first navigation data and the fourth navigation data includes determining, via the at least one processor, whether a first delta corresponding to the first navigation data and the fourth navigation data is within a first predetermined threshold; and determining, via the at least one processor, at least one second validity of the first navigation data by comparing the first navigation data and the sixth navigation data includes determining, via the at least one processor, whether a second delta corresponding to the first navigation data and the sixth navigation data is within a second predetermined threshold.

16. The method of claim 14, further comprising:

receiving, via a presentation system, the validity advisory data from the at least one processor; and presenting the validity information represented by the validity advisory data via the presentation system.

17. The method of claim 16, wherein presenting the validity information represented by the validity advisory data via the presentation system includes:

presenting at least one of:

visual validity information presented via at least one screen of a visual display unit;

aural validity information presented via at least one aural alert unit; and tactile validity information presented via at least one tactile alert unit.

18. The method of claim 14, further comprising:

generating, via the at least one processor, at least one height above threshold (HaTH) estimate by comparing the fourth navigation data to at least one runway threshold height;

establishing, via the at least one processor, seventh navigation data representative of a seventh measurement of the aircraft position as the first navigation data;

performing, via the at least one processor, at least one second integration of the second navigation data with the corrected third navigation data;

adjusting, via the at least one processor, the seventh navigation data based on the integrated second navigation data and the at least one HaTH estimate;

determining, via the at least one processor, at least one third validity of the first navigation data by comparing the first navigation data and the seventh navigation data; and generating, via the at least one processor, the validity advisory data responsive to the third validity determination.

19. The method of claim 18, wherein determining, via the at least one processor, at least one third validity of the first navigation data by comparing the first navigation data and the seventh navigation data includes:

determining, via the at least one processor, whether a third delta corresponding to the first navigation data and the seventh navigation data is within a third predetermined threshold.

20. The method of claim 14, wherein performing, via the at least one processor, at least one first integration of the second navigation data with the corrected third navigation data includes:

performing, via the at least one processor, at least one third integration of the second navigation data with eighth navigation data representative of an eighth measurement of inertial velocity received from at least one of the IRS and the ADS.

* * * * *